United States Patent
Kanasugi et al.

(10) Patent No.: US 12,151,544 B2
(45) Date of Patent: Nov. 26, 2024

(54) VEHICLE SIDE STRUCTURE

(71) Applicants: TOYOTA JIDOSHA KABUSHIKI KAISHA, Toyota (JP); AISIN CORPORATION, Kariya Aichi (JP)

(72) Inventors: Hideaki Kanasugi, Nisshin (JP); Dai Hidaka, Kariya (JP); Taiki Ishiguro, Kariya (JP)

(73) Assignees: TOYOTA JIDOSHA KABUSHIKI KAISHA, Toyota (JP); AISIN CORPORATION, Kariya Aichi (JP)

( * ) Notice: Subject to any disclaimer, the term of this patent is extended or adjusted under 35 U.S.C. 154(b) by 286 days.

(21) Appl. No.: 17/828,602

(22) Filed: May 31, 2022

(65) Prior Publication Data

US 2022/0410673 A1 Dec. 29, 2022

(30) Foreign Application Priority Data

Jun. 28, 2021 (JP) .................................. 2021-107037

(51) Int. Cl.
*B60J 5/06* (2006.01)
*E05B 77/46* (2014.01)
*E05D 15/10* (2006.01)
*E05F 15/638* (2015.01)

(52) U.S. Cl.
CPC ................. *B60J 5/06* (2013.01); *E05B 77/46* (2013.01); *E05D 15/1047* (2013.01); *E05F 15/638* (2015.01); *E05D 2015/1055* (2013.01)

(58) Field of Classification Search
CPC .. B60J 5/06; E05B 77/06; E05B 77/46; E05B 83/04; E05B 83/06; E05B 83/363; E05B 83/367; E05B 83/38; E05B 83/40; E05B 83/42; E05B 83/44; E05F 15/638; E05F 15/646; E05F 15/655; E05F 1/16; E05D 15/1081; E05D 15/1065; E05D 2015/1071; E05Y 15/1081; E05Y 15/1065; E05Y 2015/1071

See application file for complete search history.

(56) References Cited

U.S. PATENT DOCUMENTS

| 4,268,996 A | * | 5/1981 | Allen | ................... E05D 15/1081 49/223 |
| 5,594,283 A | * | 1/1997 | Bartel | ..................... E05B 77/48 180/289 |

(Continued)

FOREIGN PATENT DOCUMENTS

| DE | 102004033759 A1 * | 2/2006 | ................ B60J 5/06 |
| DE | 102007002427 A1 | 7/2008 | |

(Continued)

*Primary Examiner* — Daniel J Colilla
(74) *Attorney, Agent, or Firm* — Dinsmore & Shohl LLP

(57) ABSTRACT

An upper rail is located along an upper edge of a boarding opening. A center rail extends from a side edge of the boarding opening in a direction away from the boarding opening. A lower rail is located along a lower edge of a sliding door. An upper hinge that is guided by the upper rail and a center hinge that is guided by the center rail slide with the sliding door. A lower hinge that is guided by the lower rail is located at each of front and rear side edges of the boarding opening, and does not slide. A lower edge lock mechanism fixes the lower edge of the sliding door to a vehicle body side structure.

6 Claims, 7 Drawing Sheets

(56) References Cited

U.S. PATENT DOCUMENTS

| | | | |
|---|---|---|---|
| 2009/0072583 A1* | 3/2009 | Elliott | B60J 5/0479 296/24.3 |
| 2010/0263283 A1* | 10/2010 | Yoshioka | B60J 5/06 49/210 |
| 2016/0348409 A1* | 12/2016 | Choi | E05B 83/40 |
| 2020/0190880 A1 | 6/2020 | Yun | |
| 2022/0243502 A1* | 8/2022 | Itonaga | B60J 5/0477 |

FOREIGN PATENT DOCUMENTS

| | | | |
|---|---|---|---|
| JP | 2003-320852 A | 11/2003 | |
| JP | 2007-253885 A | 10/2007 | |
| JP | 2020-093773 A | 6/2020 | |
| JP | 2021-001531 A | 1/2021 | |
| JP | 2022-118931 A | 8/2022 | |
| WO | WO-2006024264 A1 * | 3/2006 | E05B 63/143 |

* cited by examiner

VEHICLE SIDE STRUCTURE

CROSS-REFERENCE TO RELATED APPLICATION

This application claims priority to Japanese Patent Application No. 2021-107037 filed on Jun. 28, 2021, incorporated herein by reference in its entirety.

BACKGROUND

1. Technical Field

The present disclosure relates to vehicle side structures, and particularly to a side structure of a vehicle with a sliding door.

2. Description of Related Art

So-called sliding doors that slide to open and close along the side of a vehicle are known as doors that open and close a boarding opening through which an occupant gets into and out of the vehicle. The sliding door is supported by, for example, a hinge that is guided by a rail placed on a vehicle body. The sliding door also slides when the hinge slides along the rail. For vehicles having a great overall height and a great sliding door height, sliding doors that are supported at three positions, namely in the upper, lower, and middle portions of the vehicle body, are known in the art.

Japanese Unexamined Patent Application Publication No. 2003-320852 (JP 2003-320852 A) describes a structure in which arms (22 to 25) rotatably coupled to a cab (1) support a sliding door (11) via a slide rail (26) fixed to the sliding door (11). The above signs in parentheses are the signs used in JP 2003-320852 A, and are not related to the signs used in the description of an embodiment of the present application.

SUMMARY

In the case where all of three rails are placed on the vehicle body and three hinges are placed on the sliding door supported at three positions, namely in the upper, lower, and middle portions of the vehicle body, the three hinges move with the sliding door. Therefore, the relative positional relationship among the three hinges does not change regardless of whether the sliding door is open or closed. That is, the shape of a triangle formed by connecting the three hinges does not change with opening and closing of the sliding door. On the other hand, in the case where two of the three rails are placed on the vehicle body and one of the three rails is placed on the sliding door as in JP 2003-320852 A, two hinges are placed on the sliding door and one hinge is placed on the vehicle body. The two hinges placed on the sliding door move with the sliding door, but the one hinge placed on the vehicle body does not move. Therefore, the shape of the triangle formed by connecting the three hinges changes with opening and closing of the sliding door. When the area of the triangle formed by the three hinges is large, support for the sliding door is stable. However, when the triangle is deformed and the area of the triangle is reduced, support for the sliding door becomes unstable.

The present disclosure provides increased stability of support for a sliding door when the sliding door is closed in a vehicle side structure in which a lower rail out of three rails is located on the sliding door.

A vehicle side structure according to the present disclosure includes: a vehicle body side structure including a boarding opening through which an occupant gets into and out of a vehicle; and a sliding door that slides to open and close the boarding opening. The sliding door is slidably supported by three rails located at three different heights. The vehicle side structure further includes: an upper hinge configured to slide with the sliding door; an upper rail located along an upper edge of the boarding opening on the vehicle body side structure, and configured to guide the upper hinge; a center hinge configured to slide with the sliding door; a center rail located on the vehicle body side structure and extending from a side edge of the boarding opening in a direction away from the boarding opening, the center rail being configured to guide the center hinge; a lower hinge located near the side edge of the boarding opening on the vehicle body side structure; a lower rail located at a position lower than the center rail on the sliding door, and configured to be guided when the sliding door slides; and a lower edge lock mechanism configured to fix a lower end of a tip edge of the sliding door to the vehicle body side structure when the sliding door is closed. The upper rail is located at the highest height out of the three rails, the center rail is located at the middle height out of the three rails, and the lower rail is located at the lowest height out of the three rails.

Since two of the hinges slide with the sliding door, while the remaining one hinge is located on the vehicle body side structure and does not slide. Therefore, the shape of a triangle formed by the three hinges changes as the sliding door slides. The stability of support for the sliding door support decreases when the area of the triangle decreases as the sliding door slides. However, the sliding door can be stably supported by fixing the lower end of the tip edge of the sliding door to the vehicle body side structure by the lower edge lock mechanism.

The lower rail may be located along a lower edge of the sliding door. The distance between the lower rail and the upper rail can thus be increased, and the stability of support for the sliding door is improved.

The sliding door may include a door panel. The lower rail may include a straight portion and a curved portion, the straight portion being located inward of the door panel in a lateral direction of the vehicle and at a distance from the door panel and extending from the tip edge of the sliding door along the door panel, and the curved portion extending in a curved manner from an opposite end of the straight portion from the tip edge of the sliding door toward the door panel. The lower edge lock mechanism may include a lower edge striker located at a lower edge of the boarding opening, and a lower edge lock unit including a hook configured to engage with the lower edge striker, the lower edge lock unit being located between the door panel and the straight portion of the lower rail. The space between the door panel and the lower rail can thus be effectively used.

The sliding door may include a lower edge lock unit cover, the lower edge lock unit cover being fixed to an inner side of the door panel in the lateral direction of the vehicle, and covering the lower edge lock unit located between the lower edge lock unit cover and the door panel. The straight portion of the lower rail may be located inward of the lower edge lock unit cover in the lateral direction of the vehicle. The lower edge lock unit cover can protect the lower edge lock unit.

The lower rail may include a spacer located on the straight portion of the lower rail at a position away from the lower edge lock unit in a direction toward a base edge of the sliding door, and the lower rail may be fixed to the door panel via the spacer.

The vehicle side structure may further include a weatherstrip that is located on the sliding door or the vehicle body side structure and that extends along the lower edge of the boarding opening when the sliding door is in a closed state. The lower edge lock mechanism may be configured to move the lower edge of the sliding door toward a vehicle body and press the weatherstrip against the sliding door or the vehicle body to hold the weatherstrip between the sliding door and the vehicle body. Pressing and holding the weatherstrip in this manner more effectively reduces entry of water into a vehicle cabin.

The vehicle side structure may further include a door closing sensor configured to detect closing of the sliding door. The lower edge locking mechanism may be configured to be operated by an actuator to perform a lock operation, and the door closing sensor may be configured to start the lock operation when the door closing sensor detects closing of the sliding door.

The vehicle side structure may include two of the sliding doors, and the two sliding doors may make up a double door.

Since the sliding door is supported by the lower edge lock mechanism in addition to the three hinges, the sliding door can be stably supported when in the closed state.

The lower edge lock mechanism may include two of the lower edge strikers located in a middle portion of the lower edge of the boarding opening.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. In the following description, the terms indicating relative positions and directions such as front, rear, right, left, up, and down indicate the relative positions and directions with respect to a vehicle, unless otherwise specified. The "inner side in the lateral direction of the vehicle" or "inward in the lateral direction of the vehicle" refers to the side in the right-left direction (lateral direction) of the vehicle that is closer to the centerline extending in the front-rear direction (longitudinal direction) of the vehicle, and the "outer side in the lateral direction of the vehicle" or "outward in the lateral direction of the vehicle" refers to the side in the lateral direction of the vehicle that is farther from the centerline extending in the longitudinal direction of the vehicle. In each figure, the direction of arrow FR indicates a forward direction, the direction of arrow UP indicates an upward direction, the direction of arrow LH indicates a leftward direction, and the direction of arrow OUT indicates the outer side in the lateral direction of the vehicle.

Figure 1:
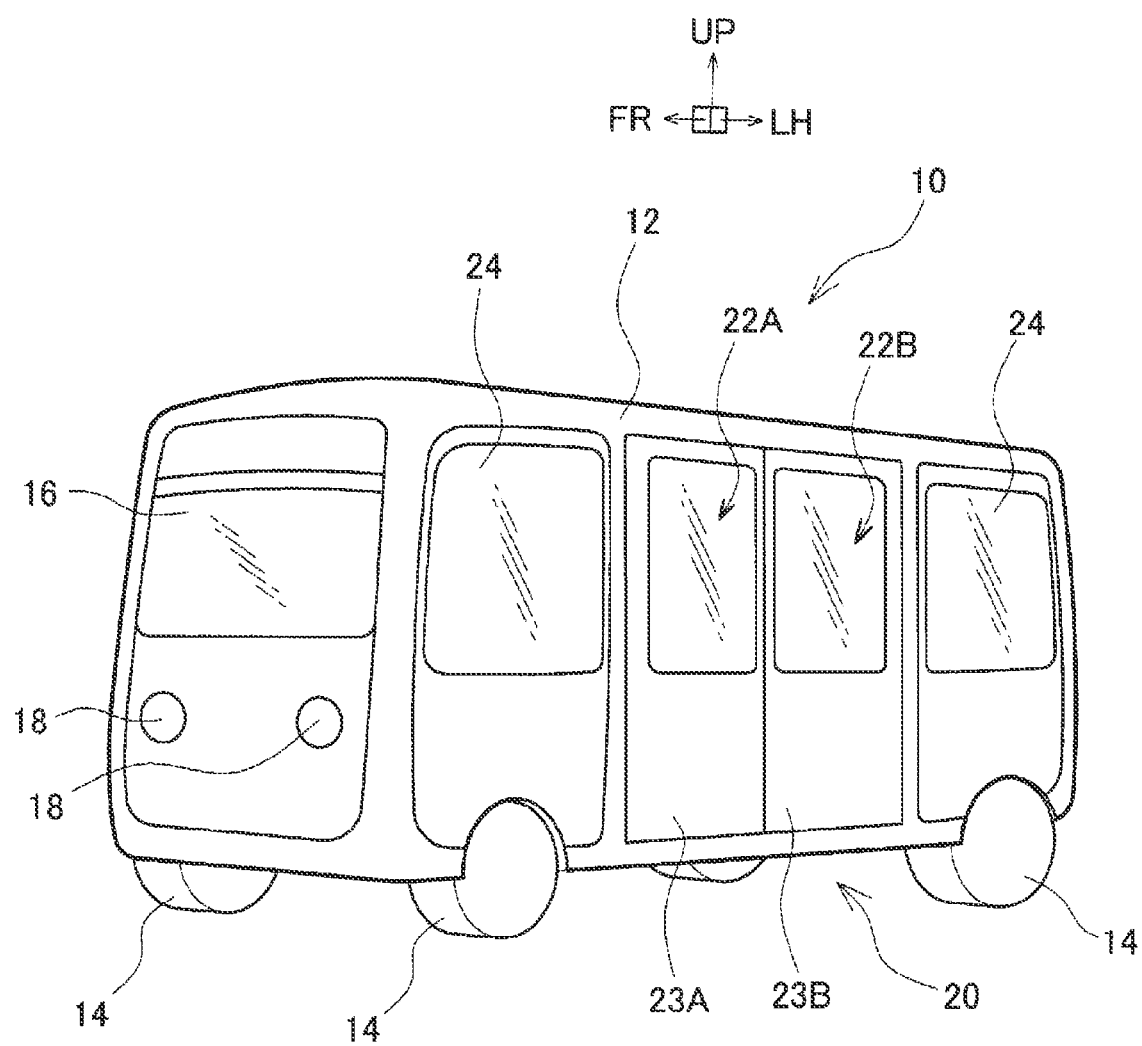
FIG. 1 shows the appearance of a vehicle according to an embodiment.

FIG. 1 is a perspective view schematically showing the appearance of a vehicle 10. The vehicle 10 includes a vehicle body 12 substantially in the shape of a rectangular parallelepiped. The vehicle body 12 has the longest dimension in the longitudinal direction, followed by in the vertical direction. Wheels 14 are located at the four corners of the vehicle body 12. A windshield glass 16 is located in an upper region of the front surface of the vehicle body 12, and headlamps 18 are mounted on the right and left sides of a lower region of the front surface of the vehicle body 12. A back window glass (not shown) having the same shape as the front windshield glass 16 is located on the rear surface of the vehicle body 12, and rear combination lamps (not shown) are mounted on the rear face of the vehicle body 12 at the same positions as the headlamps 18 on the front surface of the vehicle body 12.

A door 20 for boarding is located on a side of the vehicle body 12. The door 20 is located on one side of the vehicle body 12. Specifically, the door 20 is located on the left side of the vehicle body 12 in areas where vehicles drive on the left side of the road, and is located on the right side of the vehicle body 12 in areas where vehicles drive on the right side of the road. The door 20 may be located on both sides of the vehicle body 12. The door 20 includes two sliding doors 22A, 22B that slide in the longitudinal direction of the vehicle. The door 20 opens and closes as the sliding doors 22A, 22B slide. When the sliding doors 22A, 22B open, the sliding doors 22A, 22B first move outward in the lateral direction of the vehicle while sliding from the closed state, and then slide outside the vehicle body 12 along the side of the vehicle body 12. The sliding doors 22A, 22B are provided with door glasses that make up door windows. The portions of the sliding doors 22A, 22B other than the windows are referred to as door panels 23A, 23B. The door 20 is located substantially in the middle of the side of the vehicle body 12 in the longitudinal direction of the vehicle, and side window glasses 24 are located forward and rearward of the door 20 and make up side windows. A side window is located on the side of the vehicle body 12 where the door 20 is not located. The side window extends along the entire length in the longitudinal direction of the vehicle body 12.

Figure 2:
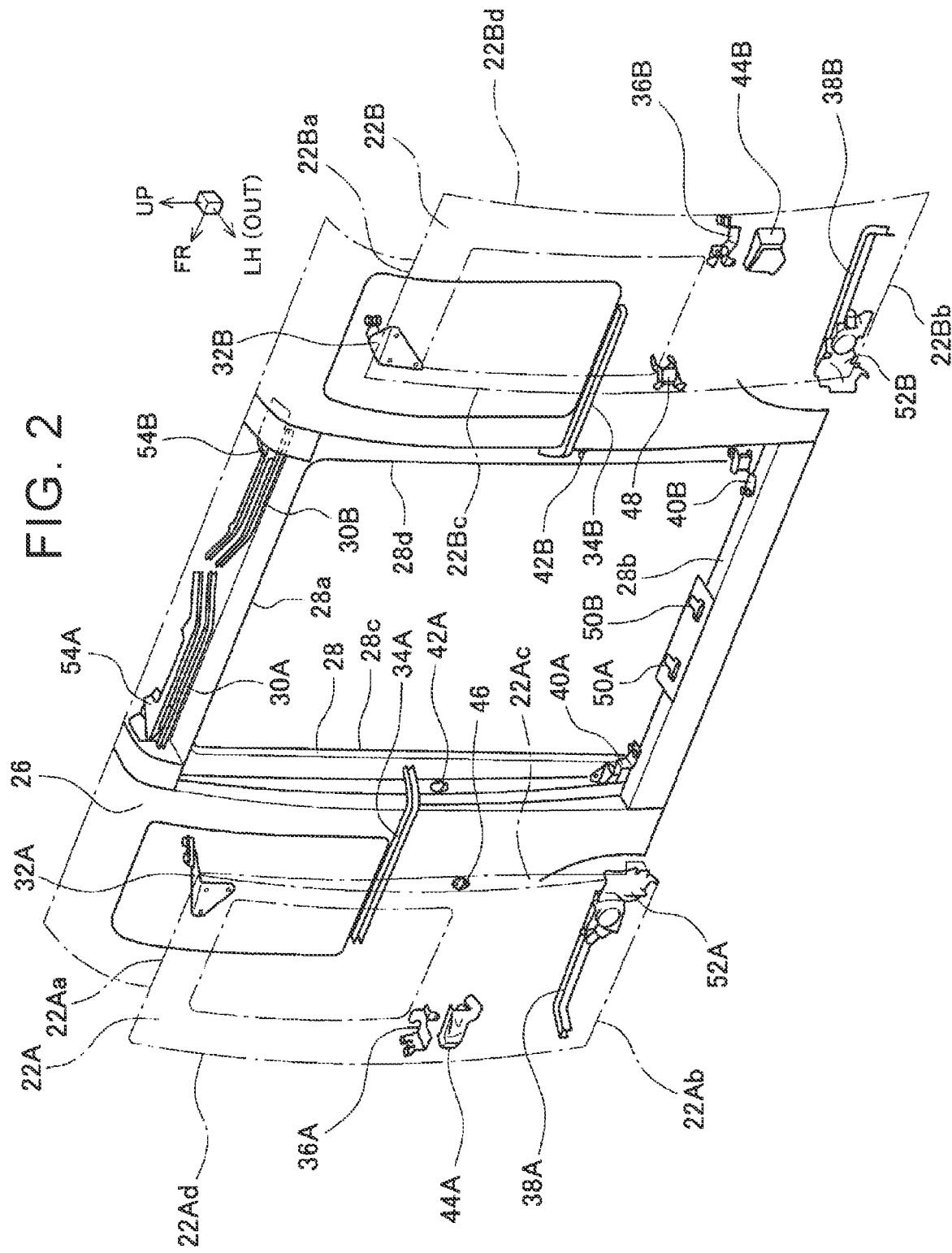
FIG. 2 is a perspective view schematically showing a side structure of a vehicle, particularly a left side structure of the vehicle.

FIG. 2 schematically shows a structure of a side portion of the vehicle, particularly a side portion related to an entrance and exit. FIG. 2 shows a vehicle side structure on the left side of the vehicle, particularly with a vehicle body side structure 26 of the vehicle body 12 and the sliding doors 22A, 22B being shown separated from each other. In the case where the door is located on the right side of the vehicle, a vehicle side structure on the right side of the vehicle is symmetrical with the vehicle side structure on the left side of the vehicle shown in the figure. The vehicle body side structure 26 has a boarding opening 28 through which an occupant etc. gets into and out of the vehicle. The sliding doors 22A, 22B open and close the boarding opening 28. In FIG. 2, the sliding doors 22A, 22B are shown in phantom.

The boarding opening 28 is substantially rectangular and has an upper edge 28a, a lower edge 28b, a front side edge 28c, and a rear side edge 28d. The upper edge 28a and the lower edge 28b extend in the longitudinal direction of the vehicle 10, and the front side edge 28c and the rear side edge 28d extend in the vertical direction.

The sliding doors 22A, 22B are also substantially rectangular, and each sliding door 22A, 22B has such a size that the sliding door 22A, 22B covers about half of the boarding opening 28. Upper edges of the two sliding doors 22A, 22B are denoted by 22Aa, 22Ba, and lower edges of the two sliding doors 22A, 22B are denoted by 22Ab, 22Bb. Edges of the two sliding doors 22A, 22B that come into contact with each other when the sliding doors 22A, 22B are closed, that is, edges of the two sliding doors 22A, 22B that define the entrance and exit when the door 20 is opened, are referred to as tip edges 22Ac, 22Bc, and the opposite edges of the two sliding doors 22A, 22B from the tip edges 22Ac, 22Bc are referred to as base edges 22Ad, 22Bd. The upper edges 22Aa, 22Ba and lower edges 22Ab, 22Bb of the sliding doors 22A, 22B correspond to the upper edge 28a and lower edge 28b of the boarding opening 28, and extend in the longitudinal direction of the vehicle 10. The tip edge 22Ac of the sliding door 22A and the tip edge 22Bc of the sliding door 22B face each other in the longitudinal direction of the vehicle 10 and extend in the vertical direction. The base edge 22Ad of the sliding door 22A extends along, and is located adjacent to, the front side edge 28c of the boarding opening 28 when the sliding door 22A is closed. The base edge 22Bd of the sliding door 22B extends along, and is located adjacent to, the rear side edge 28d of the boarding opening 28 when the sliding door 22B is closed.

The sliding doors 22A, 22B are slidably supported on the vehicle body side structure 26 at three positions of the vehicle 10, namely in the upper, middle, and lower portions of the vehicle 10, by rails and hinges. The rails extend substantially in the longitudinal direction of the vehicle 10, and the hinges slide relatively to the rails. The sliding doors 22A, 22B are guided by these rails to slide.

Upper rails 30A, 30B are placed along and near the upper edge 28a of the boarding opening 28 on the vehicle body side structure 26. The upper rail 30A corresponds to the sliding door 22A, and the upper rail 30B corresponds to the sliding door 22B. Hereinafter, the elements corresponding to the sliding door 22A are denoted by the signs with the letter "A" at the end, and the elements corresponding to the sliding door 22B are denoted by the signs with the letter "B" at the end. Upper hinges 32A, 32B are placed at the corners formed by the upper edges 22Aa, 22Ba and tip edges 22Ac, 22Bc of the sliding doors 22A, 22B. The upper hinges 32A, 32B slidably engage with the corresponding upper rails 30A, 30B. When the sliding doors 22A, 22B slide, the upper hinges 32A, 32B also slide with the sliding doors 22A, 22B.

Center rails 34A, 34B are placed on the vehicle body side structure 26. The center rail 34A extends from the front side edge 28c of the boarding opening 28 in a direction away from the boarding opening 28. Similarly, the center rail 34B extends from rear side edge 28d of the boarding opening 28 in a direction away from the boarding opening 28. The center rails 34A, 34B are located at a position lower than the upper rails 30A, 30B. For example, the center rails 34A, 34B are located substantially at the middle height of the boarding opening 28. Center hinges 36A, 36B are placed near the base edges 22Ad, 22Bd of the sliding doors 22A, 22B at the height corresponding to the height at which the center rails 34A, 34B are located. The center hinges 36A, 36B slidably engage with the corresponding center rails 34A, 34B. When the sliding doors 22A, 22B slide, the center hinges 36A, 36B also slide with the sliding doors 22A, 22B.

Lower rails 38A, 38B are placed on the sliding doors 22A, 22B at a position lower than the center rails 34A, 34B, that is, near the lower edges 22Ab, 22Bb of the sliding doors 22A, 22B, for example, along the lower edges 22Ab, 22Bb. A lower hinge 40A is placed on the front side edge 28c of the boarding opening 28 at the height corresponding to the height at which the lower rail 38A is located. The lower hinge 40A relatively slidably engages with the lower rail 38A. A lower hinge 40B is placed on the rear side edge 28d of the boarding opening 28 at the height corresponding to the height at which the lower rail 38B is located. The lower hinge 40B relatively slidably engages with the lower rail 38B. When the sliding doors 22A, 22B slide, the lower rails 38A, 38B also slide with the sliding doors 22A, 22B.

A front side edge striker 42A is placed in the middle portion in the vertical direction of the front side edge 28c of the boarding opening 28. A base edge lock unit 44A corresponding to the front side edge striker 42A is placed near the base edge 22Ad of the sliding door 22A. Similarly, a rear side edge striker 42B is placed in the middle portion in the vertical direction of the rear side edge 28d of the boarding opening 28. A base edge lock unit 44B corresponding to the rear side edge striker 42B is placed near the base edge 22Bd of the sliding door 22B. Each base edge lock unit 44A, 44B include a hook (not shown) that catches a rod-like portion of the corresponding side edge strikers 42A, 42B. When the sliding doors 22A, 22B are closed, the hooks of the base edge lock units 44A, 44B engage with the corresponding side edge strikers 42A, 42B. The sliding doors 22A, 22B are thus fixed to the vehicle body 12 at the base edges 22Ad, 22Bd.

A tip edge striker 46 is placed in the middle portion in the vertical direction of the tip edge 22Ac of the sliding door 22A. A tip edge lock unit 48 corresponding to the tip edge striker 46 is placed near the tip edge 22Bc of the sliding door 22B. The tip edge lock unit 48 includes a hook (not shown) that catches a rod-like portion of the tip edge striker 46. When the sliding doors 22A, 22B are closed, the hook of the tip edge lock unit 48 engages with the corresponding tip edge striker 46. The sliding doors 22A, 22B are thus fixed to each other. The positions of the tip edge striker 46 and the tip edge lock unit 48 may be opposite from those described above. That is, the tip edge striker 46 may be placed on the sliding door 22B, and the tip edge lock unit 48 may be placed on the sliding door 22A.

Lower edge strikers 50A, 50B are placed in the middle portion of the lower edge 28b of the boarding opening 28. A lower edge lock unit 52A corresponding to the lower edge striker 50A is placed at the corner formed by the tip edge 22Ac and lower edge 22Ab of the sliding door 22A. A lower edge lock unit 52B corresponding to the lower edge striker 50B is placed at the corner formed by the tip edge 22Bc and lower edge 22Bb of the sliding door 22B. Each lower edge lock unit 52A, 52B includes a hook 66 (see FIG. 4) that catches a rod-shaped portion of the corresponding lower edge strikers 50A, 50B. When the sliding doors 22A, 22B are closed, the hook 66 engage with the corresponding lower edge strikers 50A, 50B. The sliding doors 22A, 22B are thus fixed to the vehicle body 12 at the lower edges 22Ab, 22Bb. The lower edge striker 50A and the lower edge lock unit 52A make up a lower edge lock mechanism that fixes the lower end of the tip edge 22Ac of the sliding door 22A to the vehicle body side structure 26. The lower edge striker 50B and the lower edge lock unit 52B also make up a lower edge lock mechanism that fixes the lower end of the tip edge 22Bc of the sliding door 22B to the vehicle body side structure 26. The locks at the lower edges of the sliding doors 22A, 22B will be described in detail later.

Drive units 54A, 54B that drive the sliding doors 22A, 22B to slide are mounted near the upper edge 28a of the boarding opening 28 on the vehicle body side structure 26. Each drive unit 54A, 54B includes a drive motor (not shown) and a transmission element (not shown) such as a wire connecting the drive motor and the upper hinges 32A, 32B. The drive motors cause the upper hinges 32A, 32B to slide along the upper rails 30A, 30B. The sliding doors 22A, 22B thus slide to open and close.

Figure 3:
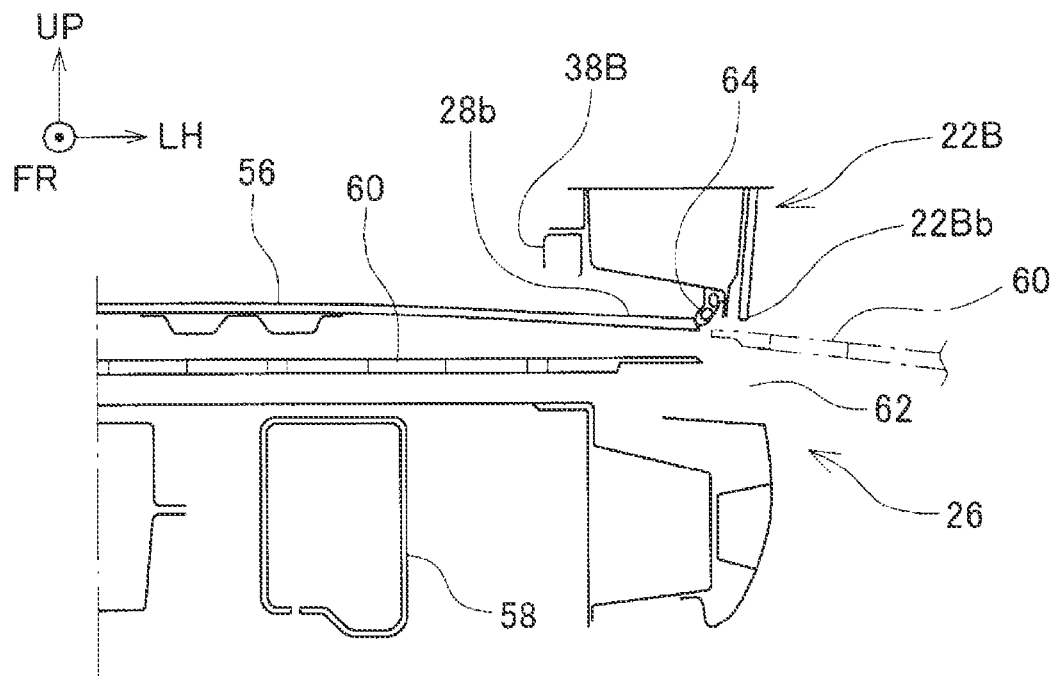
FIG. 3 is a sectional view showing a structure around a lower edge of a boarding opening.

FIG. 3 shows, in section perpendicular to the longitudinal direction of the vehicle, the vehicle body side structure 26 and the sliding door 22B around the lower edge 28b of the boarding opening 28. A section of the sliding door 22A also appears in a similar manner. The lower edge 28b of the boarding opening 28 is a part of the left side edge of a floor 56, and the floor 56 is substantially flush with the lower edge 28b of the boarding opening 28. A ramp 60 is stored between the floor 56 corresponding to the boarding opening 28 and an underframe 58 of the vehicle body 12. The ramp 60 is deployed in the lateral direction of the vehicle 10 through a ramp opening 62 (shown by long dashed short dashed line in FIG. 3), as necessary, when, for example, an occupant on a wheelchair gets into and out of the vehicle. The ramp opening 62 is adjacent to the lower edge 28b of the boarding opening 28 of the vehicle body side structure 26. Deployment and storage of the ramp 60 can be implemented by a drive device including a drive motor.

A weatherstrip 64 is placed along the lower edge 22Bb of the sliding door 22B. The weatherstrip 64 extends along the lower edge 22Bb. In this example, the weatherstrip 64 is fixed to the sliding door 22B, and the tip edge of the weatherstrip 64 contacts the side edge of the floor 56. The weatherstrip 64 extends along the entire length of the lower edge of the sliding door 22B and seals the gap between the lower edge 28b of the boarding opening 28 and the sliding door 22B to restrain water etc. from entering from the outside. A weatherstrip is similarly placed on the sliding door 22A. The number of weatherstrips is not limited to one, and two or more weatherstrips may be placed in parallel. The weatherstrip may be placed on the vehicle body side structure 26 instead of on the sliding door, or may be placed on both the sliding door and the vehicle body side structure 26.

Figure 4:
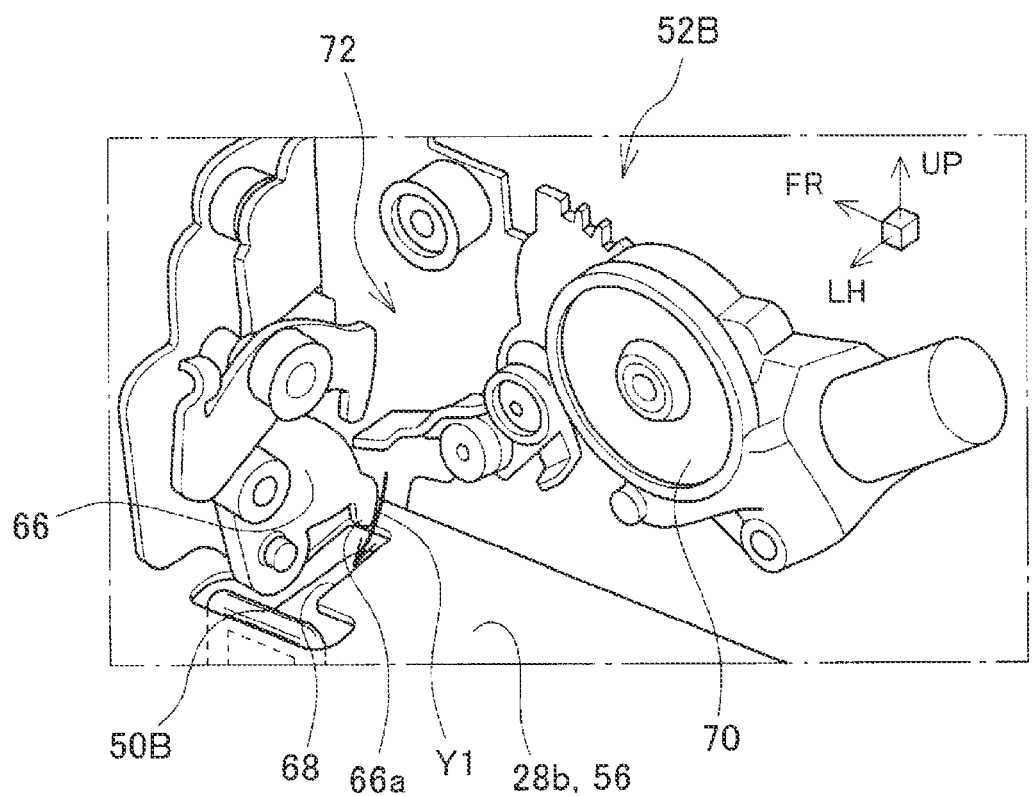
FIG. 4 shows a mechanism for locking a lower edge of a sliding door.

FIG. 4 shows the lower edge striker 50B located at the lower edge 28b of the boarding opening 28, and the lower edge lock unit 52B located on the sliding door 22B. FIG. 4 shows the state when the sliding door 22B is closed. In this state, the hook 66 of the lower edge lock unit 52B faces the lower edge striker 50B.

The floor 56 that defines the lower edge 28b of the boarding opening 28 has an opening 68 with a T-shape (hereinafter referred to as "T-shaped opening 68"), and the lower edge striker 50B is placed in the T-shaped opening 68. In particular, the lower edge striker 50B may be placed so as not to protrude beyond the surface of the floor 56. The lower edge striker 50B has, for example, a U-shape, and is placed in an inverted U-shape. A rod-like portion of the lower edge striker 50B that corresponds to the bottom of the letter "U" corresponds to a portion of the T-shaped opening 68 that corresponds to the horizontal portion of the letter "T."

The lower edge lock unit 52B includes: the hook 66; an actuator 70 including a drive motor; and a transmission mechanism 72 that transmits the driving force of the actuator 70 to the hook 66. The transmission mechanism 72 includes a gear, a link, a lever, etc. The hook 66 includes a claw 66a at its tip. When the hook 66 is rotated in the direction of arrow Y1 in the figure, the claw 66a enters a portion of the T-shaped opening 68 that corresponds to the vertical portion of the letter "T," and engages with the lower edge striker 50B. The hook 66, particularly the claw 66a, has such a shape that relatively pulls the lower edge striker 50B toward the hook 66 with rotation of the hook 66. The hook 66 therefore reduces the gap between the sliding door 22B and the floor 56 when the hook 66 engages with the lower edge striker 50B. This configuration improves contact of the weatherstrip 64 to the floor 56.

Figure 5:
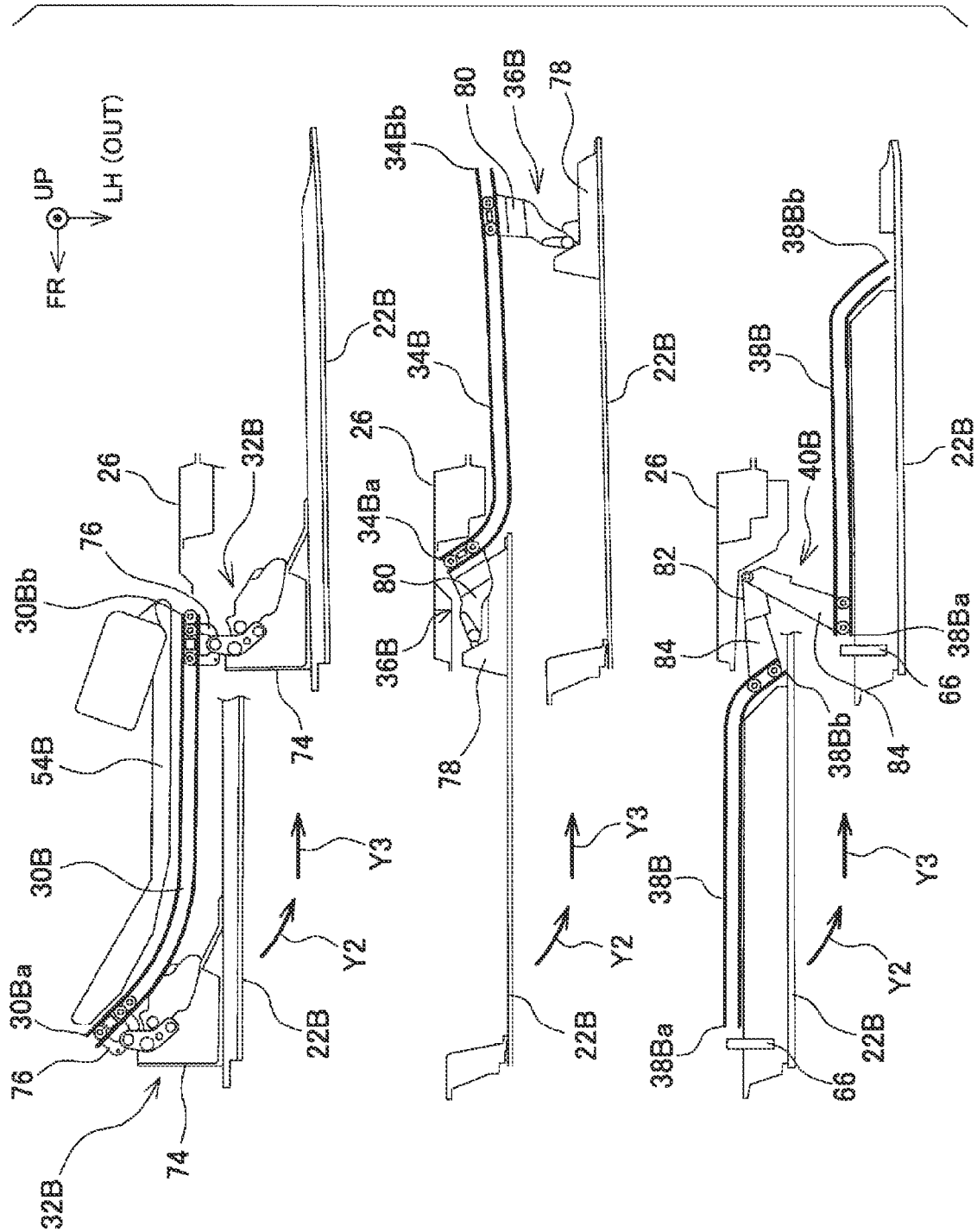
FIG. 5 schematically shows rails and hinges that are located in upper, middle, and lower portions of the vehicle.

FIG. 5 shows how the sliding door 22B slides, and shows the closed and open states of the sliding door 22B in an overlapping manner. The upper part of FIG. 5 shows a support structure related to the upper rail 30B, the middle part of FIG. 5 shows a support structure related to the center rail 34B, and the lower part of FIG. 5 shows a support structure related to the lower rail 38B. The configuration related to the sliding door 22A appears symmetrically with the configuration related to the sliding door 22B.

Each of the rails 30B, 34B, and 38B extends in the longitudinal direction. The end of each rail 30B, 34B, 38B located closer to the other sliding door 22A is referred to as "tip end," and the end of each rail 30B, 34B, 38B located farther away from the other sliding door 22A is referred to as "base end." In FIG. 5, the left end of each rail 30B, 34B, 38B is the tip end, and the right end of each rail 30B, 34B, 38B is the base end.

The upper rail 30B is curved inward in the lateral direction of the vehicle toward its tip end 30Ba. The upper rail 30B has a substantially straight shape on the base end 30Bb side of the curved portion. The upper hinge 32B includes an upper hinge base 74 fixed to the sliding door 22B, and an upper hinge bracket 76 that is rotatable with respect to the upper hinge base 74. The upper hinge bracket 76 rotatably supports at its tip end a guide roller that engages with the upper rail 30B.

The center rail 34B is curved inward in the lateral direction of the vehicle toward its tip end 34Ba. The center rail 34B has a substantially straight shape on the base end 34Bb side of the curved portion. The center rail 34B may be slightly curved inward in the lateral direction of the vehicle toward the base end 34Bb. The base edge 22Bd of the sliding door 22B is thus located closer to the vehicle body 12 when the sliding door 22B is opened. The center hinge 36B includes a center hinge base 78 fixed to the sliding door 22B, and a center hinge bracket 80 that is rotatable with respect to the center hinge base 78. The center hinge bracket 80 rotatably supports at its tip end a guide roller that engages with the center rail 34B.

The lower rail 38B is curved outward in the lateral direction of the vehicle toward the base end 38Bb. The lower rail 38B has a substantially straight shape on the tip end 38Ba side of the curved portion. The lower hinge 40B includes a lower hinge base 82 fixed to the vehicle body side structure 26, and a lower hinge bracket 84 that is rotatable with respect to the lower hinge base 82. The lower hinge bracket 84 rotatably supports at its tip end a guide roller that engages with the lower rail 38B.

When the sliding door 22B opens from the closed state shown on the left side in FIG. 5, the sliding door 22B is first guided by the curved portions of the rails 30B, 34B, and 38B to move rearward while moving outward in the lateral direction of the vehicle, as shown by arrows Y2. As a result, the sliding door 22B protrudes outward in the lateral direction of the vehicle from the vehicle body side structure 26. Subsequently, the sliding door 22B slides outside the vehicle body side structure 26 rearward along the surface of the vehicle body side structure 26 as shown by arrows Y3. The sliding door 22B is thus moved to the open state shown on the right side in FIG. 5.

When the sliding door 22B is closed, it operates in the opposite manner to that described above. When the sliding door 22B moves to the closed position, the base edge lock unit 44B, the tip edge lock unit 48, and the lower edge lock unit 52B operate to pull the sliding door 22B to the closed position and position the sliding door 22B.

The opening and closing operation of the other sliding door 22A is the same as that of the sliding door 22B described above except for the sliding direction.

Figure 6:
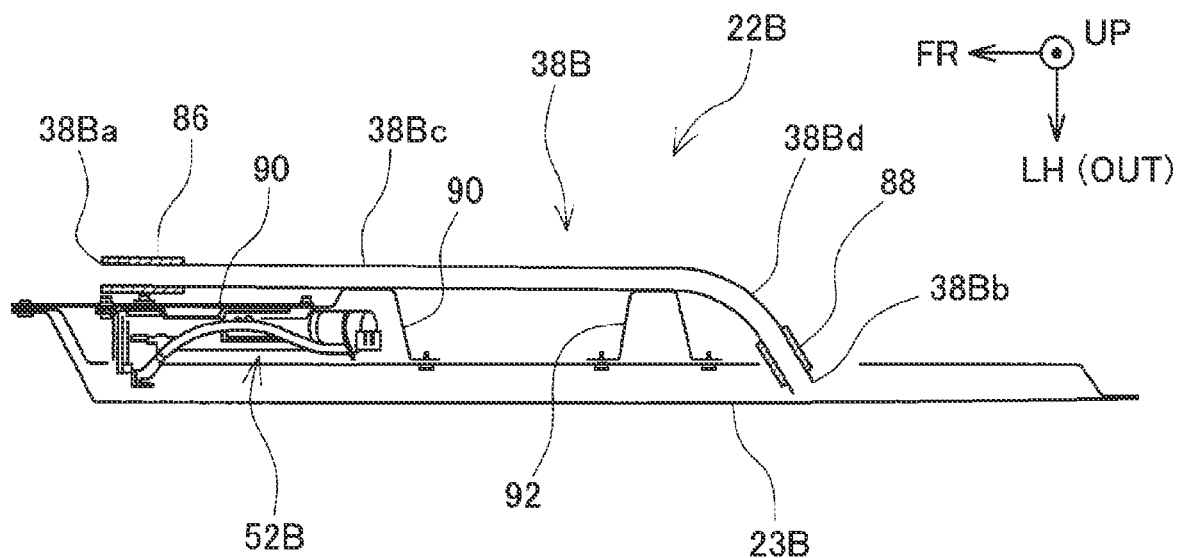
FIG. 6 is a horizontal section showing a configuration around a lower rail of the sliding door.
Figure 7:
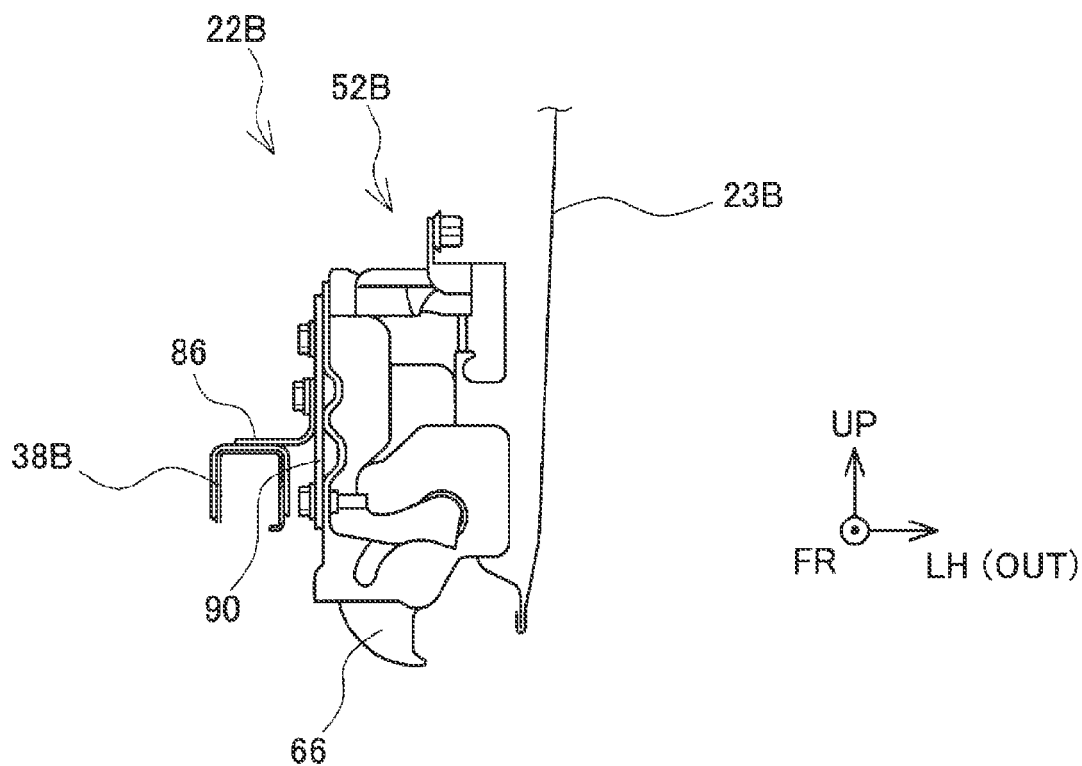
FIG. 7 shows the configuration around the lower rail of the sliding door as viewed from the tip edge side of the sliding door.

FIGS. 6 and 7 schematically show the configuration around the lower edge portion of the sliding door 22B, particularly around the lower rail 38B. FIG. 6 is a horizontal section at the position of the lower rail 38, and FIG. 7 shows the lower edge of the tip end of the sliding door 22B as viewed from the front. The lower rail 38B is located inward of the door panel 23B in the lateral direction of the vehicle. The lower rail 38B is supported at its tip end 38Bc by a lower rail tip end bracket 86 fixed to the lower edge lock unit 52B. The lower rail 38B is also supported at its base end 38Bb by a lower rail base end bracket 88 fixed to the door panel 23B. The lower rail 38B includes a straight portion 38Bc and a curved portion 38Bd. The straight portion 38Bc is located at a distance from the door panel 23B and extends from the tip edge 22Bc of the sliding door 22B toward the base edge 22Bd of the sliding door 22B along the door panel 23B. The curved portion 38Bd extends in a curved manner from the end of the straight portion 38Bc on the base edge 22Bd side of the sliding door 22B toward the door panel 23B. The lower edge lock unit 52B of the lower edge lock mechanism is located between the straight portion 38Bc of the lower rail 38B and the door panel 23B. The lower rail 38B has the curved portion 38Bd in order to cause the sliding door 22B to protrude outward in the lateral direction of the vehicle from the vehicle body side structure 26 when the sliding door 22B is opened. Therefore, there is a space between the straight portion 38Bc of the lower rail 38B and the door panel 23B. Space can be effectively used by placing the lower edge lock unit 52B in this space.

A lower edge lock unit cover 90 is fixed to the door panel 23B. The lower edge lock unit cover 90 is located on the inner side of the door panel 23B in the lateral direction of the vehicle so as to cover the lower edge lock unit 52B. As shown in FIG. 6, the lower edge lock unit cover 90 has a substantially L-shape, and is fixed to the door panel 23B both near a tip edge of the door panel 23B and behind the lower edge lock unit 52B. The lower edge lock unit 52B is located between the door panel 23B and the lower edge lock unit cover 90, and is surrounded and protected by the door panel 23B and the lower edge lock unit cover 90. The lower rail 38B, particularly the straight portion 38Bc, is located inward of the lower edge lock unit cover 90 in the lateral direction of the vehicle. The lower edge lock unit 52B, the lower edge lock unit cover 90, and the lower rail 38B can be attached to the door panel 23B in this order.

A spacer 92 is located on the base edge 22Bd side of the sliding door 22B with respect to the lower edge lock unit 52B, and is fixed to the door panel 23B. The lower rail 38B is fixed to the spacer 92, and is fixed to the door panel 23B via the spacer 92. Since the lower rail 38B is supported by the spacer 92 in addition to the lower rail tip end bracket 86 and the lower rail base end bracket 88, the load applied to the lower rail 38B can be distributed among them.

The configuration around the lower rail 38A of the sliding door 22A appears symmetrically with the configuration related to the lower rail 38B of the sliding door 22B described above.

Figure 8:
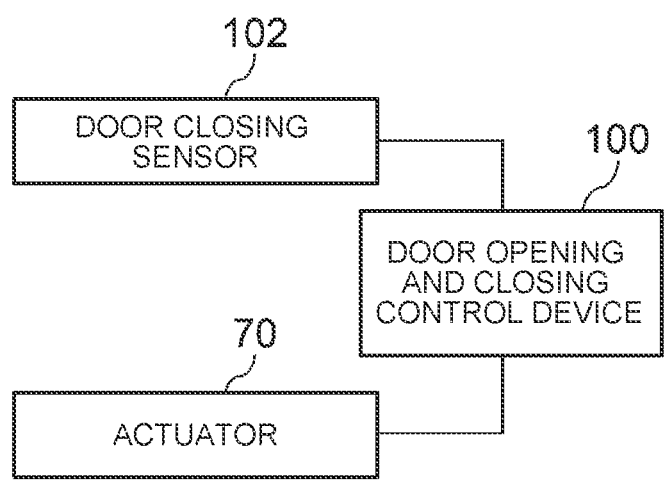
FIG. 8 is a block diagram showing a configuration related to the operation of a lower edge lock mechanism.

FIG. 8 is a block diagram of a configuration related to control of the operation of the lower edge lock units 52A, 52B. A door opening and closing control device 100 controls the opening and closing operation of the sliding doors 22A, 22B, and may control the operation of the drive units 54A, 54B in addition to controlling the lower edge lock units 52A, 52B. In the case where the base edge lock unit 44B and the tip edge lock unit 48 are operated by an actuator, the door opening and closing control device 100 may also control the operation of the base edge lock unit 44B and the tip edge lock unit 48.

When a door closing sensor 102 detects closing of the sliding door 22B, the door opening and closing control device 100 drives the actuator 70 of the lower edge lock unit 52B to rotate the hook 66 in the direction of arrow Y1 shown in FIG. 4 to engage the hook 66 with the lower edge striker 50B. As a result, the lower end of the tip edge 22Bc of the sliding door 22B is pulled toward the vehicle body side structure 26. Moreover, the weatherstrip 64 along the lower edge of the sliding door 22B is pressed against the vehicle body side structure 26, particularly against the floor 56, to tightly seal between the sliding door 22B and the floor 56. The door closing sensor 102 can be a courtesy switch. The lower edge lock unit 52A on the other sliding door 22A is controlled in a similar manner.

Figure 9:
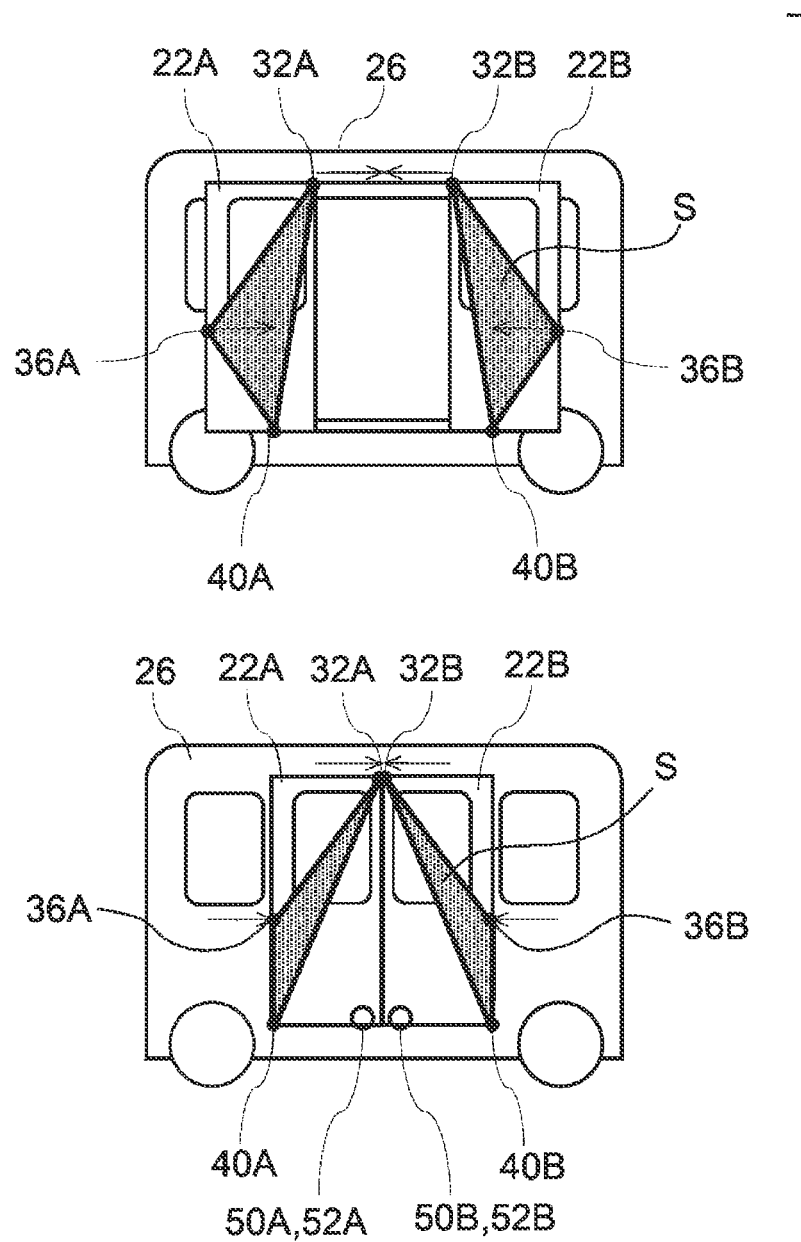
FIG. 9 shows a relationship between opening and closing of the sliding door and support points by hinges.

FIG. 9 illustrates the operation and functions of the side structure of the vehicle equipped with the sliding doors 22A, 22B of the present embodiment. The upper side of FIG. 9 shows the vehicle with the sliding doors 22A, 22B opened, and the lower side of FIG. 9 shows the vehicle with the sliding doors 22A, 22B closed. The upper hinges 32A, 32B that support the upper portions of the sliding doors 22A, 22B, and the center hinges 36A, 36B that support the middle portions of the sliding doors 22A, 22B slide with the sliding doors 22A, 22B. On the other hand, the lower hinges 40A, 40B that support the lower portions of the sliding doors 22A, 22B are fixed to the vehicle body side structure 26, and do not move even when the sliding doors 22A, 22B slide.

Regarding the sliding door 22B, the area of a triangle S formed by the three hinges 32B, 36B, and 40B is large when the sliding door 22B is open, and is small when the sliding door 22B is closed. In other words, the distance between the longest side of the three sides of the triangle S, namely the side connecting the upper hinge 32B and the lower hinge 40B, and the remaining vertex (center hinge 36B) is large when the sliding door 22B is open, and is small when the sliding door 22B is closed. The stability of support for the sliding door 22B therefore tends to be lower when the sliding door 22B is closed than when the sliding door 22B is open. The same applies to the other sliding door 22A.

If these three hinges are configured to slide with the sliding door 22B, the shape of the triangle S will not change even when the sliding door 22B is closed, and the stability of support for the sliding door 22B can be maintained. In this case, however, the vehicle body side structure 26 needs to have a lower rail for guiding the lower hinge that slides with the sliding door 22B, and the space for this lower rail hinders the floor 56 from being located at a low level, namely hinders so called lowering of the floor. In the case where a storage space for the ramp 60 is required under the floor 56, the space limitation for this lower rail is severer.

In the vehicle side structure of the present embodiment, the lower rails 38A, 38B are provided on the sliding doors 22A, 22B. This contributes to lowering of the floor. As described above, the stability of support for the sliding doors 22A, 22B decreases when the sliding doors 22A, 22B are closed. However, the stability of support for the sliding doors 22A, 22B is increased as the lower edge strikers 50A, 50B and the lower edge lock units 52A, 52B pull the lower ends of the tip edges 22Ac, 22Bc of the sliding doors 22A, 22B toward the vehicle body side structure 26 when the sliding doors 22A, 22B are closed. This configuration also increases the sealing performance of the weatherstrip 64.

Although the support structure for the double sliding door is described above, this support structure may used for a single sliding door.

What is claimed is:

1. A vehicle side structure, comprising:
a vehicle body side structure including a boarding opening through which an occupant gets into and out of a vehicle;
a sliding door that slides to open and close the boarding opening;
an upper hinge configured to slide with the sliding door;
an upper rail located along an upper edge of the boarding opening on the vehicle body side structure, and configured to guide the upper hinge;
a center hinge configured to slide with the sliding door;
a center rail located on the vehicle body side structure and extending from a side edge of the boarding opening in a direction away from the boarding opening, the center rail being configured to guide the center hinge;
a lower hinge located near the side edge of the boarding opening on the vehicle body side structure;
a lower rail located at a position lower than the center rail on the sliding door, and configured to be guided when the sliding door slides; and
a lower edge lock mechanism configured to fix a lower end of a tip edge of the sliding door to the vehicle body side structure when the sliding door is closed,
wherein the lower rail is located along a lower edge of the sliding door;
wherein the sliding door includes a door panel;
wherein the lower rail includes a straight portion and a curved portion, the straight portion being located inward of the door panel in a lateral direction of the vehicle and at a distance from the door panel and extending from the tip edge of the sliding door along the door panel, and the curved portion extending in a curved manner from an opposite end of the straight portion from the tip edge of the sliding door toward the door panel;
wherein the lower edge lock mechanism includes a lower edge striker located at a lower edge of the boarding opening, and a lower edge lock unit including a hook configured to engage with the lower edge striker, the lower edge lock unit being located between the door panel and the straight portion of the lower rail;
wherein the sliding door includes a lower edge lock unit cover, the lower edge lock unit cover being fixed to an inner side of the door panel in the lateral direction of the vehicle, and covering the lower edge lock unit located between the lower edge lock unit cover and the door panel; and
wherein the straight portion of the lower rail is located inward of the lower edge lock unit cover in the lateral direction of the vehicle.

2. The vehicle side structure according to claim 1, wherein:
the lower rail includes a spacer located on the straight portion of the lower rail at a position away from the lower edge lock unit in a direction toward a base edge of the sliding door; and
the lower rail is fixed to the door panel via the spacer.

3. The vehicle side structure according to claim 1, further comprising a weatherstrip that is located on the sliding door or the vehicle body side structure and that extends along the lower edge of the boarding opening when the sliding door is in a closed state, wherein the lower edge lock mechanism is configured to move the lower edge of the sliding door toward a vehicle body and press the weatherstrip to hold the weatherstrip.

4. The vehicle side structure according to claim 3, further comprising a door closing sensor configured to detect closing of the sliding door, wherein the lower edge locking mechanism is configured to be operated by an actuator to perform a lock operation, and the door closing sensor is configured to start the lock operation when the door closing sensor detects closing of the sliding door.

5. The vehicle side structure according to claim 1, further comprising two of the sliding doors, wherein the two sliding doors make up a double door.

6. The vehicle side structure according to claim 5, wherein the lower edge lock mechanism includes two of lower edge strikers located in a middle portion of the lower edge of the boarding opening.

* * * * *